Figure 1:
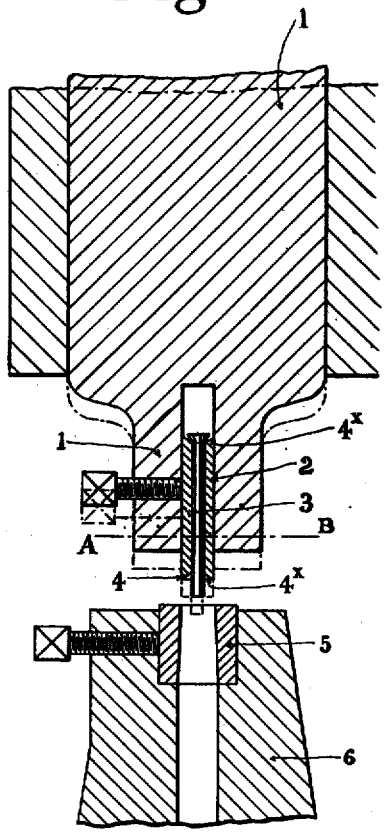

T. H. WILSON.
STAMPING MACHINE FOR CUTTING OUT ARTICLES FROM SHEET METAL.
APPLICATION FILED MAY 28, 1919.

1,320,189.  Patented Oct. 28, 1919.

Inventor
Thomas Henry Wilson
By
his Attorneys

UNITED STATES PATENT OFFICE.

THOMAS HENRY WILSON, OF BRAMLEY, LEEDS, ENGLAND.

STAMPING-MACHINE FOR CUTTING OUT ARTICLES FROM SHEET METAL.

1,320,189.  Specification of Letters Patent.   Patented Oct. 28, 1919.

Application filed May 28, 1919. Serial No. 300,381.

*To all whom it may concern:*

Be it known that I, THOMAS HENRY WILSON, a subject of the King of Great Britain, residing at Aero Metal Works, Bramley, Leeds, in the county of York, England, have invented certain new and useful Improvements in Stamping-Machines for Cutting Out Articles from Sheet Metal, and of which the following is a specification.

In the cutting out of articles in the flat from sheet metal plates by means of stamping machines, dies of a contour corresponding to that of the article to be cut have been employed for stamping out the article at one blow; but as a fresh set of dies is required for each differently shaped article to be cut, the cost of working under this method is very considerable. It has also before been proposed to fit the stamping machine with a punch or cutting tool with a view to roughly nibbling off the metal of the plate to the approximate shape of the article required; but the arrangement employed has been such as to only allow the nibbling to be effected in a more or less straight line, with the result that considerable chipping and filing had to be put in afterward in order to bring the article to the finished state.

Now the object of this present invention is to provide the stamping machine with a punch or cutting tool of a construction which will enable the metal plate to be traversed under the punch in any direction at will, the arrangement being such that by using a templet on the plate, say by clamping or otherwise attaching the two together, the article according to the templet can be cut out from the plate in a speedy and efficient manner by the nibbling action of the tool so as to necessitate only a very slight filing up of the article afterward.

According to my invention, I employ a tubular punch or cutting tool fitted with a central pin which is depended below its base or cutting edge for a suitable distance, and the said tool is mounted in the vertically reciprocating slide of the stamping machine in the ordinary way and is adapted to work in conjunction with the usual stationary circular die provided on the bed-plate of the machine, so that, on a sheet of metal with a templet or design attached thereto being passed under the punch or cutting tool, the edge of the metal plate always encounters the central pin of the cutting tool so as to prevent the plate being pushed under the tool too far and at the same time insure the cutting action of the tool being perfectly uniform.

In employing this arrangement, the central pin of the tool acts as a stop against which the edge of the plate is caused to bear so that the said plate can be traversed around the tool in any direction with the said pin as a fulcrum, whereby the tool is free to cut out the article to the shape of the templet in an efficient manner; and by causing the tool to reciprocate rapidly, the cutting out operation can be speedily and expeditiously performed by the rapid nibbling action of the tool.

The tubular punch or cutting tool is preferably made with a cutting edge at each end thereof so as to enable the same to be reversed at will, and by making the said cutting edges in the form of a concave recess a gripping action is imparted to the tool which prevents the plate slipping back when effecting the cut.

The central pin is preferably loosely mounted in the tubular cutting tool, so as to enable the two parts to be tempered differently to suit the work they are required to perform.

In order that the invention may be clearly understood, I will proceed to describe the same with reference to the example of construction shown in the accompanying drawings; wherein:—

Figure 2:
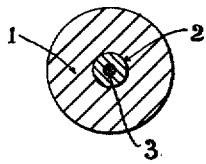

Figure 1 is a sectional elevation of a portion of a stamping machine, fitted with a punch or cutting tool constructed in accordance with my invention; and Fig. 2 is a sectional plan view taken on the line A—B of Fig. 1.

According to my invention, the vertically reciprocating slide 1 of the machine is fitted with a tubular punch or cutting tool 2 having a central pin 3 depending below its base 4 and being adapted to work in conjunction with the usual stationary circular die 5 carried on the bed-plate 6 of the machine, the central pin 3 being loosely mounted in the tubular cutting tool 2 which is formed with a cutting edge $4^x$ at each end thereof so as to enable the said tool 2 to be reversed at will.

The metal plate to be cut is passed into position when the cutting tool 2 is in the position shown in full lines at Fig. 1; after which the slide 1 is lowered so as to bring the cutting tool 2 into the position shown in dotted lines at Fig. 1, the central pin 3 of the said tool 2 passing down through a hole previously formed in the plate. This dotted position is the top center position of the slide 1 which is now rapidly reciprocated so as to cause the tool 2 to effect the cutting out operation, the plate under treatment being pushed forward at each cut of the tool 2 so as to cause the edge of the plate to bear against the central pin 3 and so prevent the plate being pushed under the tool 2 too far and at the same time insure the cutting action of the tool 2 being preferably uniform.

It will thus be seen that the central pin 3 of the cutting tool 2 acts as a stop against which the edge of the plate is caused to bear so that the said plate can be traversed around the tool 2 in any direction with the pin 3 as a fulcrum, whereby the cutting out operation is rendered capable of being speedily and expeditiously performed by the rapid nibbling action of the tool 2.

The cutting edges 4* of the reversible tool 2 are made by forming the said tool 2 with a concave recess at each end thereof, whereby a gripping action is imparted to the tool 2 sufficient to prevent the plate slipping back when effecting the cut.

What I claim as my invention and desire to secure by Letters Patent is:—

1. In a stamping machine for cutting out articles in the flat from sheet metal plates, the combination with a vertically reciprocating slide and a circular die, of a tubular punch or cutting tool carried by said vertically reciprocating slide, and a central pin depending below the base of the said tubular punch or cutting tool and being adapted to work in conjunction with the said circular die of the machine.

2. In a stamping machine for cutting out articles in the flat from sheet metal plates, the combination with a vertically reciprocating slide and a stationary circular die, of a tubular punch or cutting tool carried by the said vertically reciprocating slide, and a central pin mounted loosely in the said tubular punch or cutting tool and depending below the base thereof, the said loosely mounted central pin being adapted to work in conjunction with the stationary circular die of the machine.

3. In a stamping machine for cutting out articles in the flat from sheet metal plates, the combination with a vertically reciprocating slide and a stationary circular die, of a tubular punch or cutting tool formed with a cutting edge at both ends thereof and being carried by the said slide, and a central pin mounted to slide in the said tubular punch or cutting tool and depending below the base thereof, the said central pin being adapted to work in conjunction with the stationary circular die of the machine.

In witness whereof I have hereunto set my hand in the presence of two witnesses.

THOMAS HENRY WILSON.

Witnesses:
 JOHN JOWETT,
 CYRIL DELLANEY.